(12) United States Patent
Kurian et al.

(10) Patent No.: US 10,789,340 B2
(45) Date of Patent: Sep. 29, 2020

(54) DYNAMIC DEVICE ACTIVATION CONTROL

(71) Applicant: Bank of America Corporation, Charlotte, NC (US)

(72) Inventors: Manu Kurian, Dallas, TX (US); Jerzy Miernik, Allen, TX (US)

(73) Assignee: Bank of America Corporation, Charlotte, NC (US)

( * ) Notice: Subject to any disclaimer, the term of this patent is extended or adjusted under 35 U.S.C. 154(b) by 206 days.

(21) Appl. No.: 15/819,371

(22) Filed: Nov. 21, 2017

(65) Prior Publication Data

US 2019/0156004 A1  May 23, 2019

(51) Int. Cl.

| | |
|---|---|
| *G06F 17/00* | (2019.01) |
| *G06F 21/31* | (2013.01) |
| *G06F 21/32* | (2013.01) |
| *G06F 21/34* | (2013.01) |
| *G06F 21/44* | (2013.01) |
| *G06F 21/45* | (2013.01) |
| *G06F 21/82* | (2013.01) |
| *G06F 21/83* | (2013.01) |
| *G06F 21/84* | (2013.01) |
| *G06Q 20/12* | (2012.01) |
| *G06Q 20/20* | (2012.01) |
| *G06Q 20/40* | (2012.01) |

(Continued)

(52) U.S. Cl.
CPC .............. *G06F 21/32* (2013.01); *G08B 5/36* (2013.01)

(58) Field of Classification Search
CPC . G06F 3/14; G06F 17/00; G06F 21/31; G06F 21/32; G06F 21/34; G06F 21/44; G06F 21/45; G06F 21/82; G06F 21/83; G06F 21/84; G06Q 20/12; G06Q 20/20; G06Q 20/40; H04L 63/20
See application file for complete search history.

(56) References Cited

U.S. PATENT DOCUMENTS

| | | | |
|---|---|---|---|
| 3,938,110 A | * | 2/1976 | Kataoka ............. G01R 33/1207 365/29 |
| 6,213,391 B1 | | 4/2001 | Lewis |
| 7,121,471 B2 | | 10/2006 | Beenau et al. |

(Continued)

*Primary Examiner* — Alexander Lagor
*Assistant Examiner* — Kalish K Bell
(74) *Attorney, Agent, or Firm* — Banner & Witcoff, Ltd.; Michael A. Springs

(57) ABSTRACT

Systems for controlling activation of a device are provided. In some examples, a system may receive biometric data from a user requesting to activate an event processing device. The biometric data may be compared to pre-stored data associated with an authorized user. If the received biometric data matches pre-stored data, the system may transmit an instruction to an event processing device to activate the event processing device. In some examples, activating the event processing device may include enabling the device for use in processing events. For instance, a chip arranged on the event processing device may be activated and enabled for use in processing an event based on the instruction. In some examples, activating an event processing device may include transmitting an instruction to one or more light emitting diodes to illuminate. Illumination of the LEDs may make visible event processing device information in an information display region that is not visible when the LEDs are not illuminated.

18 Claims, 11 Drawing Sheets

(51) Int. Cl.
*G06F 3/14* (2006.01)
*G08B 5/36* (2006.01)

(56) References Cited

U.S. PATENT DOCUMENTS

| | | |
|---|---|---|
| 7,360,689 B2 | 4/2008 | Beenau et al. |
| 8,489,513 B2 | 7/2013 | Bishop et al. |
| 2006/0000899 A1* | 1/2006 | Bonalle ............... G06Q 20/341 235/380 |
| 2006/0161789 A1 | 7/2006 | Doughty et al. |
| 2007/0245158 A1 | 10/2007 | Giobbi et al. |
| 2008/0016002 A1 | 1/2008 | Beenau et al. |
| 2009/0083156 A1* | 3/2009 | Cotten ................... G06Q 20/04 705/14.19 |
| 2016/0063478 A1* | 3/2016 | Koeppel .............. G06Q 20/327 705/35 |
| 2017/0024713 A1* | 1/2017 | May .................... G06O 20/102 |

\* cited by examiner

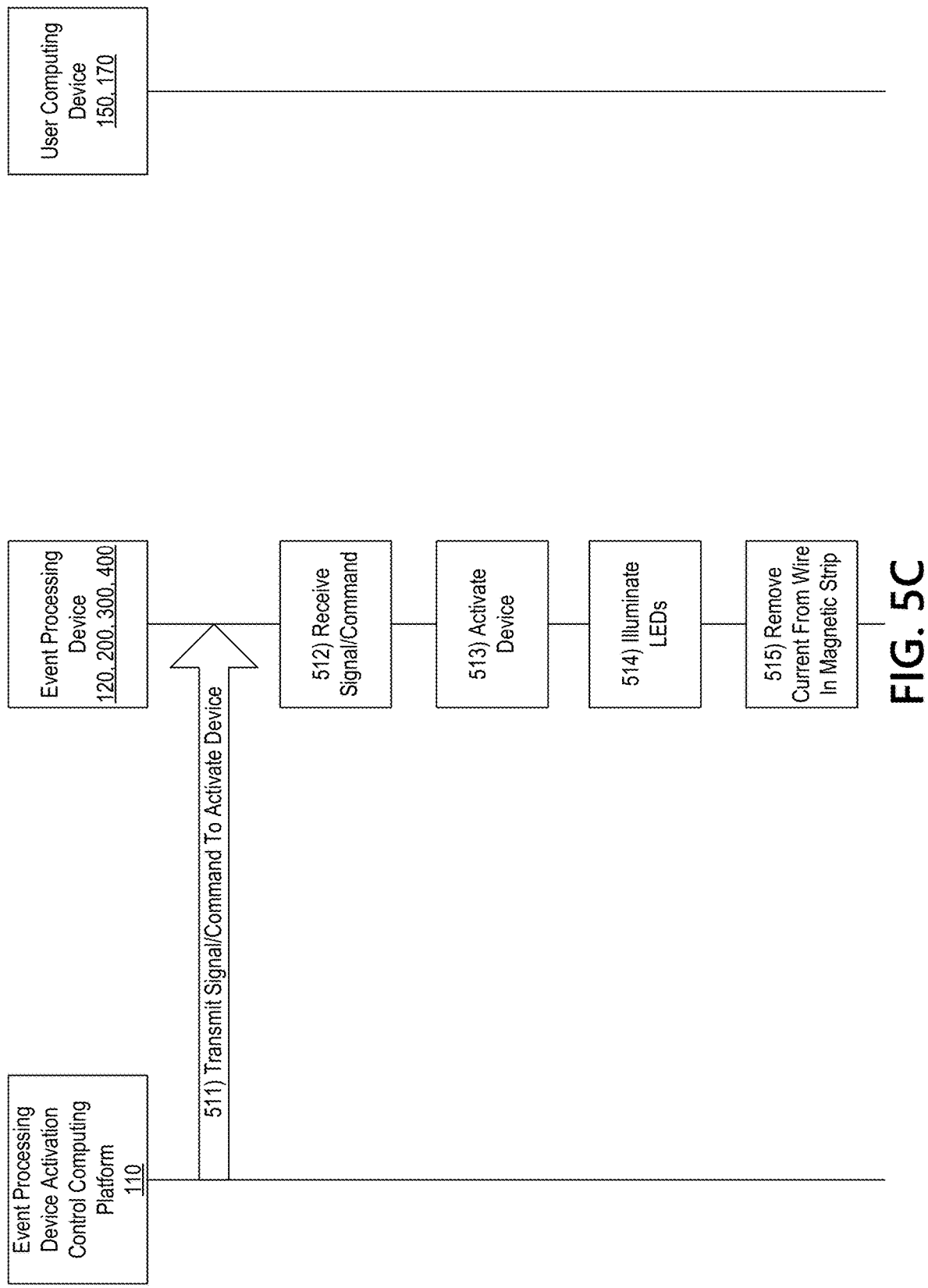

US 10,789,340 B2

DYNAMIC DEVICE ACTIVATION CONTROL

BACKGROUND

Aspects of the disclosure relate to electrical computers, systems, and controlling activation of one or more devices. In particular, one or more aspects of the disclosure relate to using biometric data to control activation of a device and/or to provide varying functionality of the device.

User authentication and processes for performing user authentication are changing. In today's world, maintaining privacy and security of information is paramount. Accordingly, providing secure methods of authenticating users through the use of reliable data is advantageous. For instance, relying on biometric data, such as deoxyribonucleic acid (DNA) of a user may be a reliable form of authentication.

In addition, controlling functionality of a device based on user authentication may also provide additional safeguards against unauthorized use. For instance, by controlling activation of a device, limiting parameters associated with functionality of a device, and the like, additional security against unauthorized use may be provided.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately authenticating users and controlling activation of one or more devices based on user authentication.

In some examples, a system, computing platform, or the like, may receive biometric data from a user requesting to activate an event processing device. In some examples, the biometric data may be compared to pre-stored data associated with an authorized user. If the received biometric data matches pre-stored data, the system, computing platform, or the like, may transmit an instruction to an event processing device to activate the event processing device. In some examples, activating the event processing device may include enabling the device for use in processing events. For instance, a chip arranged on the event processing device may be activated and enabled for use in processing an event based on the instruction.

In some examples, activating an event processing device may include transmitting an instruction to one or more light emitting diodes (LEDs) arranged in the event processing device causing the LEDs to illuminate. In some arrangements, illumination of the LEDs may make visible event processing device information in an information display region that is not visible when the LEDs are not illuminated.

Additionally or alternatively, activation of an event processing device may further include distorting or removing distortion from a magnetic strip of the event processing device. Distorting or removing distortion may enable or disable use of the magnetic strip.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5A-5C depict an illustrative event sequence for implementing event processing device activation control functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to user authentication and activation of an event processing device based on the user authentication. In some examples, biometric data may be used to authenticate a user. If received biometric data matches pre-stored biometric data, the system may activate or enable an event processing device for use (e.g., transfer the event processing device from a disabled or deactivated state to an enabled or activated state). Such a transfer may include enabling a chip on the event processing device to be used in processing the event.

In some examples, the event processing device may include a default state. The default state may include the disabled or deactivated state, such that use of the event processing device in processing an event may require user authentication as discussed herein.

In some examples, activating an event processing device may include causing illumination of one or more light emitting diodes (LEDs) arranged on the event processing device. Illumination of the LEDs may make visible event processing device information in an information display region that might not be visible when the LEDs are not illuminated.

Additionally or alternatively, activating or deactivating an event processing device may include distorting or removing distortion from a magnetic strip including encoded data used to process one or more events with the event processing device.

These and various other arrangements will be discussed more fully below.

Figure 1A:
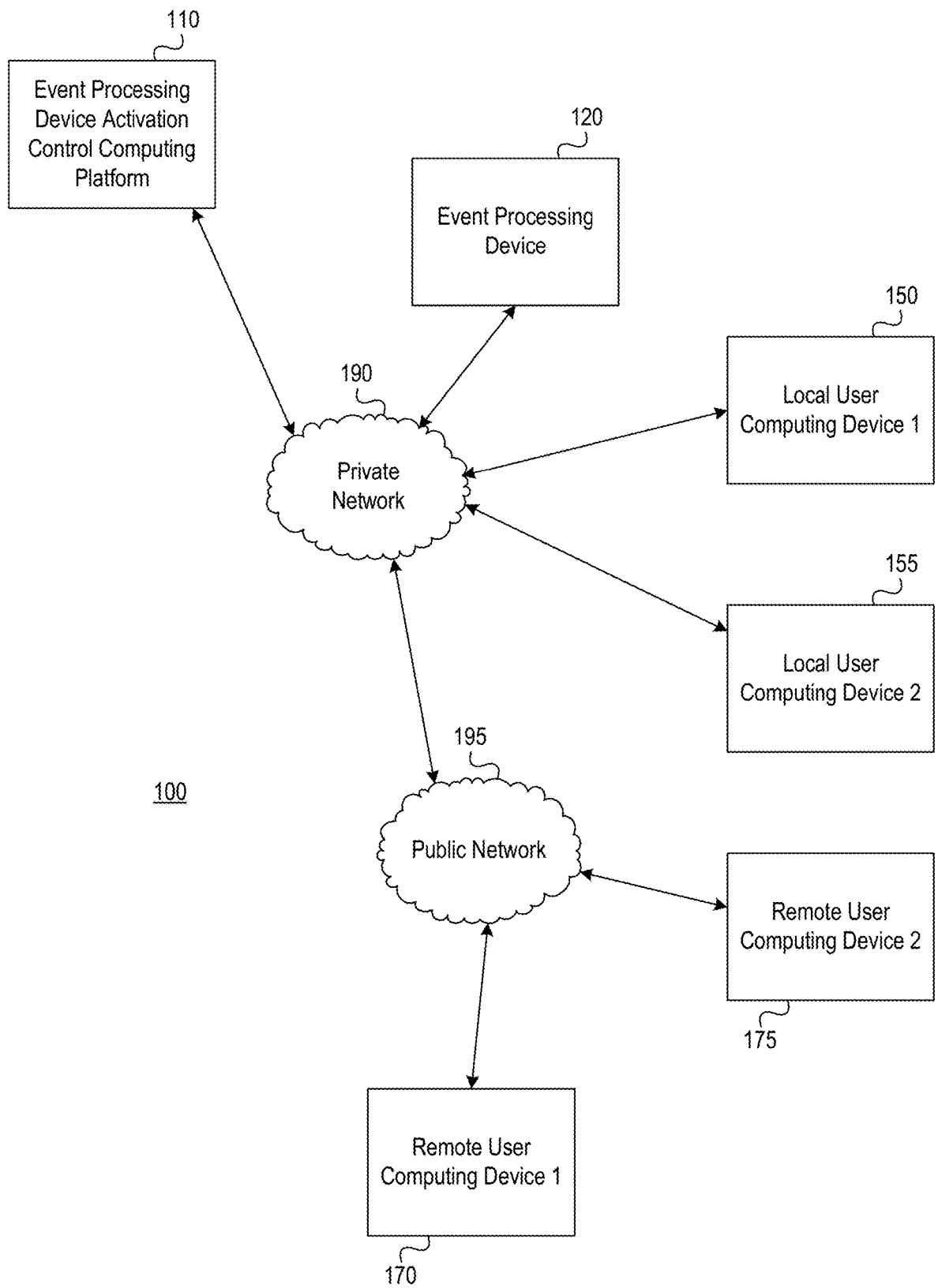
FIGS. 1A and 1B depict an illustrative computing environment for implementing event processing device activation control functions in accordance with one or more aspects described herein.
Figure 1B:
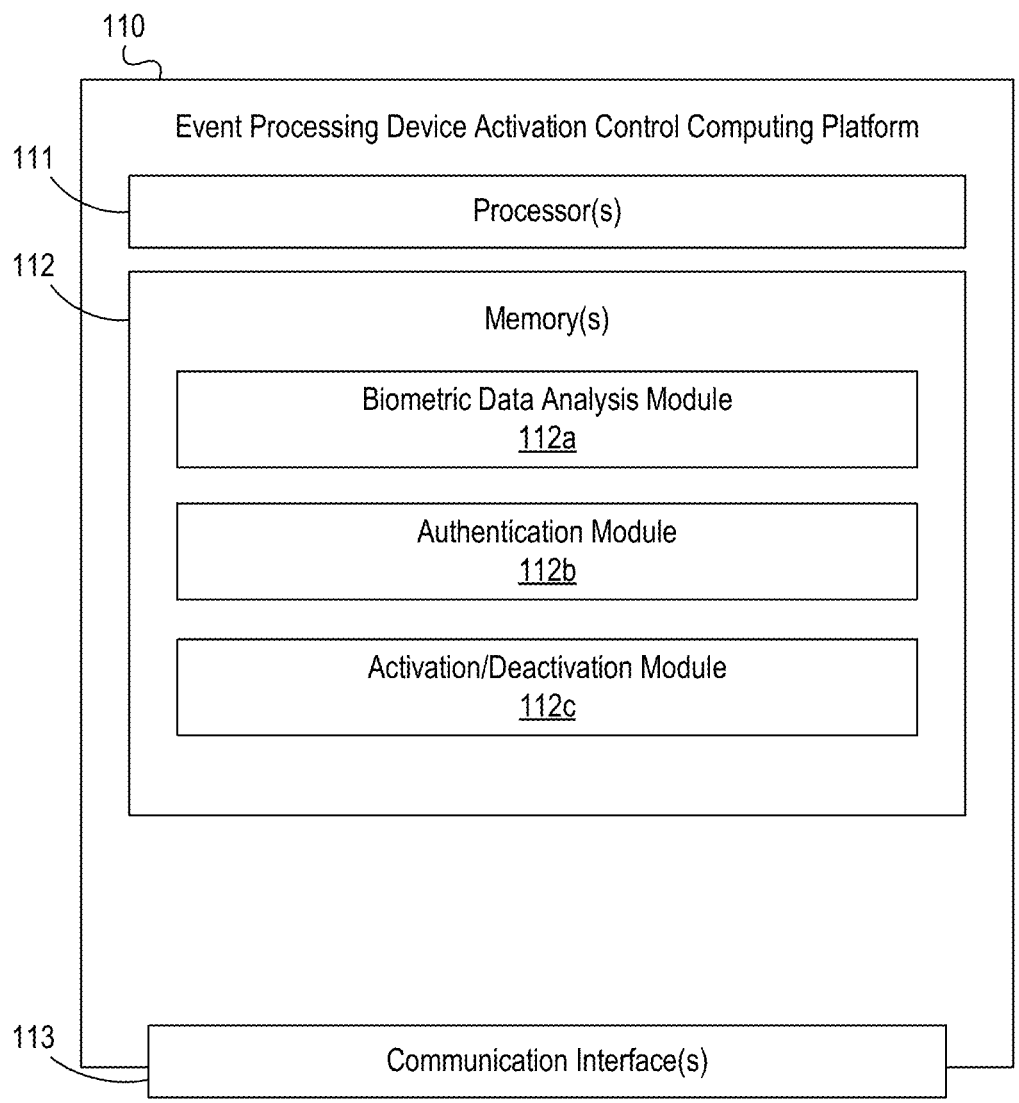

FIGS. 1A and 1B depict an illustrative computing environment for implementing and using a system for controlling event processing device activation in accordance with one or more aspects described herein. Referring to FIG. 1A, computing environment 100 may include one or more computing devices and/or other computing systems. For example, computing environment 100 may include an event processing device activation control computing platform 110, one or more event processing devices 120, a first local user computing device 150, a second local user computing device 155, a first remote user computing device 170, and a second remote user computing device 175.

Event processing device activation control computing platform 110 may be configured to host and/or execute one or more components to control activation and/or deactivation of an event processing device, such as event processing device 120. In some examples, biometric data may be received from an event processing device 120. In some examples, the biometric data may include fingerprint and/or iris scan of a user of the event processing device 120. Additionally or alternatively, biometric data may include deoxyribonucleic acid (DNA) collected from the user (e.g., person attempting to process an event with the event processing device), blood flow data, heat signature, or the like. This biometric data may be collected via a biometric data collection region configured on the event processing device 120 and including one or more sensors configured to capture biometric data and transmit data to, for instance, the event processing device activation control computing platform 110.

The event processing device activation control computing platform 110 may further process the received data and determine whether the data matches pre-stored biometric data for an authorized user. If so, the event processing device activation control computing platform 110 may transmit a signal to the event processing device 120 activating the device (e.g., enabling the device for use). In some examples, activating the device may also include transmitting a signal to one or more light emitting diodes (LEDs) arranged in the event processing device causing the LEDs to illuminate, thereby making an information display region visible.

If the received biometric data does not match pre-stored data, the event processing device activation control computing platform may transmit a signal to the event processing device 120 preventing the device from being used. In some examples, that may include preventing LEDs from illuminating (thereby causing the information display region to remain not visible), transmitting a signal to the device causing an interruption (e.g., scrambling) of data on a magnetic strip of the device, and the like.

As indicated above, the computing environment 100 may include an event processing device 120. Although only one event processing device 120 is shown in FIG. 1A, a plurality of event processing devices may be in communication with the event processing device activation control computing platform 110 and/or one or more other devices in computing environment 100. As will be discussed more fully here, event processing device 120 may be used to process one or more events (e.g., complete or process a transaction, or the like). The event processing device 120 may include one or more of a chip and/or a magnetic strip including data that may be used to process the event. Event processing device 120 may include one or more features, aspects, or the like, described herein with respect to event processing devices 200, 300 and/or 400.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 and/or remote user computing device 170, 175 may be used to control or implement aspects of the functions performed by the event processing device activation control computing platform 110, to establish rules or limits associated with the event processing device activation control computing platform 110, and the like.

The remote user computing devices 170, 175 may be used to communicate with, for example, event processing device activation control computing platform 110, receive and display notifications, transmit data, and the like.

In one or more arrangements local user computing device 150, local user computing device 155, remote user computing device 170, and/or remote user computing device 175 may be any type of computing device or combination of devices capable of performing the particular functions described herein. For example, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include event processing device activation control computing platform 110. As illustrated in greater detail below, event processing device activation control computing platform 110 may include one or more computing devices configured to perform one or more of the functions described herein. For example, event processing device activation control computing platform 110 may include one or more computers (e.g., laptop computers, desktop computers, servers, server blades, or the like).

As mentioned above, computing environment 100 also may include one or more networks, which may interconnect one or more of event processing device activation control computing platform 110, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, event processing device activation control computing platform 110, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect event processing device activation control computing platform 110, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., event processing device activation control computing platform 110, local user computing device 150, local user computing device 155) with one or more networks and/or computing devices that are not associated with the organization. For example remote user computing device 170, and/or remote user computing device 175 might not be associated with an organization that operates private network 190 (e.g., because remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect remote user computing device 170 and remote user computing device 175 to private network 190 and/or one or more computing devices connected thereto (e.g., event processing device activation control computing platform 110, local user computing device 150, local user computing device 155).

Referring to FIG. 1B, event processing device activation control computing platform 110 may include one or more processors 111, memory 112, and communication interface 113. A data bus may interconnect processor(s) 111, memory 112, and communication interface 113. Communication interface 113 may be a network interface configured to support communication between event processing device activation control computing platform 110 and one or more networks (e.g., private network 190, public network 195, or the like). Memory 112 may include one or more program modules having instructions that when executed by processor(s) 111 cause event processing device activation control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event processing device activation control computing platform 110 and/or by different computing devices that may form and/or otherwise make up event processing device activation control computing platform 110.

For example, memory 112 may have, store, and/or include a biometric data analysis module 112a. Biometric data analysis module 112a may store instructions and/or data that may cause or enable the event processing device activation control computing platform 110 to receive biometric data from one or more users attempting to process an event via an event processing device. In some examples, the biometric data may include fingerprint, iris scan, DNA, blood flow, heat signature, pulse, or the like. The biometric data may be collected via a sensor arranged on the event processing device. The sensor may collect the biometric data and transmit the data to the event processing device activation control computing platform 110, where it may be analyzed by the biometric data analysis module 112a.

Memory 112 may further have, store, and/or include an authentication module 112b. Authentication module 112b may store instructions and/or data that may cause or enable the event processing device activation control computing platform 110 to receive compare the biometric data received and analyzed by the biometric data analysis module 112a to determine whether the data matches pre-stored data for one or more authorized users of the event processing device. For instance, the authentication module 112b may compare, for example, a fingerprint received and analyzed by the biometric data analysis module 112a to one or more pre-stored fingerprints of one or more authorized users of the event processing device. In some examples, the biometric data may be pre-stored during, for example, a registration process.

If the received data matches pre-stored data, the user may be authenticated and a command may be transmitted an activation/deactivation module 112c that the requesting user has been authenticated. Alternatively, if the received data does not match pre-stored data, a command may be transmitted to the activation/deactivation module 112 that the requesting user has not been authenticated.

The event processing device activation control computing platform 110 may further have, store, and/or include the activation/deactivation module 112c. Activation/deactivation module 112c may store instructions and/or data that may cause or enable the event processing device activation control computing platform 110 to activate (e.g., enable the event processing device for use) or deactivate (e.g., disable or prevent the event processing device from being used) the event processing device. In some examples, activating the event processing device may be performed in response to an indication that a requesting user has been authenticated. In some arrangements, activating the event processing device may include transmitting a signal, command or instruction to the event processing device to enable the device for use. In some examples, enabling the device for use may include illuminating one or more LEDs arranged in the event processing device. Illumination of the one or more LEDs may make an information display region visible to a user, where the information display region was not visible prior to activation of the event processing device.

In another example, a magnetic strip scrambling device may be embedded in a magnetic strip arranged on a rear of the event processing device. In some examples, the scrambling device may be disabled upon activation of the event processing device, thereby enabling the event processing device for use. These and other examples will be discussed more fully herein.

Figure 2A:
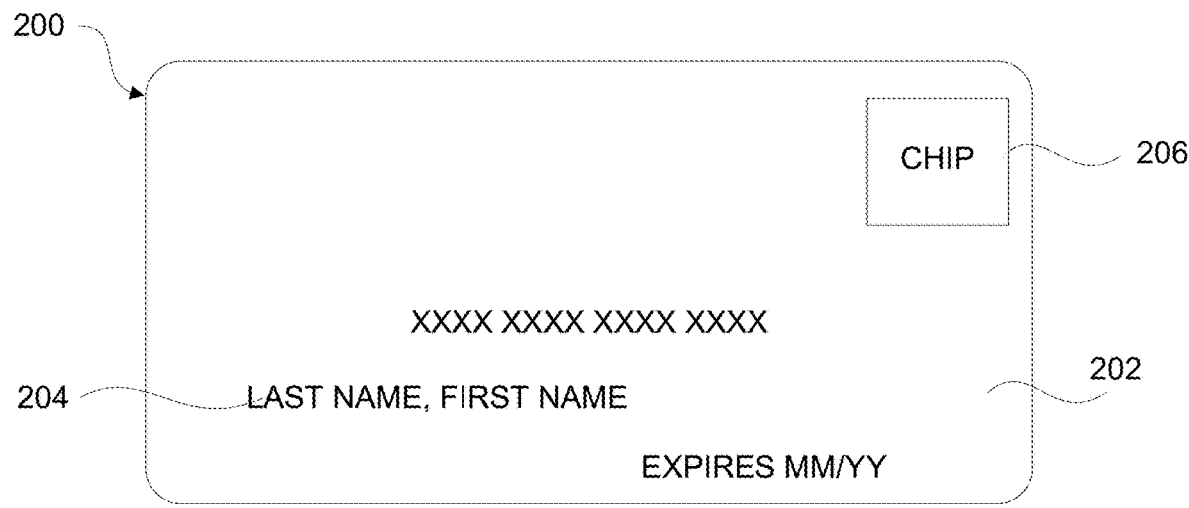
FIGS. 2A and 2B illustrate one example event processing device in accordance with one or more aspects described herein.
Figure 2B:
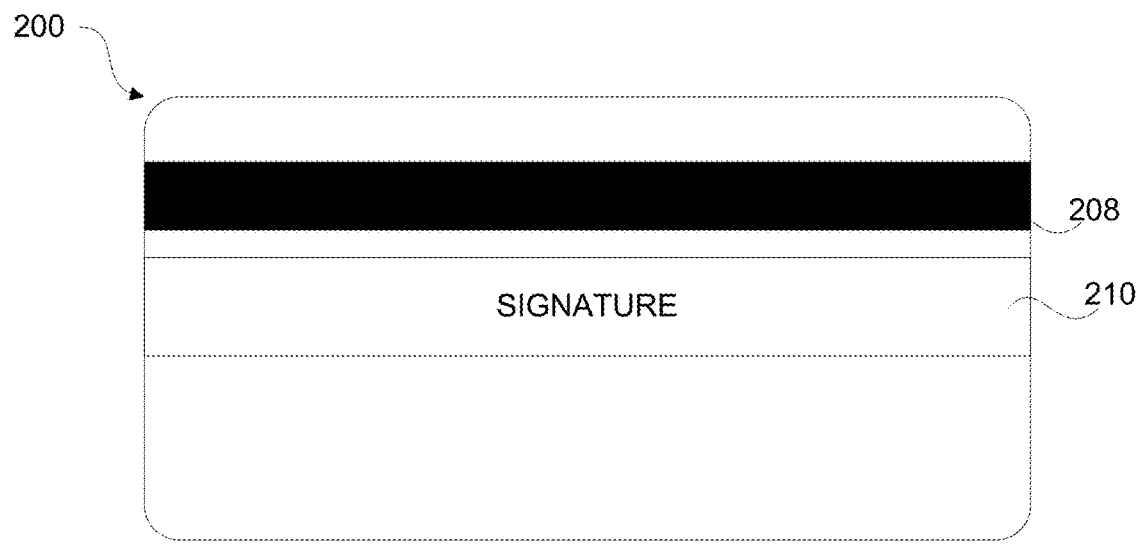

FIGS. 2A and 2B illustrate one example event processing device that may be used with one or more aspects described herein. FIG. 2A illustrates a front view of the event processing device 200 and FIG. 2B illustrates a rear view of the event processing device 200. The event processing device 200 may include a generally planar region 202. As shown in FIG. 2A, the front of the event processing device 200 may include an information display region 204. The information display region may include information associated with a user of the event processing device (e.g., name or other identifier), an account number associated with the event processing device, an expiration date of the event processing device, and the like. The event processing device 200 may further include a chip 206 that may be used to process or complete one or more events (e.g., process a transaction, withdrawal, or the like). In some examples, the chip 206 may be activated (e.g., to enable use of the event processing device) and deactivated (e.g., to prevent use of the event processing device) as will be discussed more fully herein.

With reference to FIG. 2B, the event processing device 200 may include a magnetic strip. The magnetic strip 208 may include encoded data associated with a user of the event processing device, an account of the event processing device, an expiration date of the event processing device, a security code of the event processing device, and the like. In some examples, the magnetic strip 208 may be used to process or complete one or more events.

Event processing device 200 may further include a signature region 210. Signature region 210 may include an area for a user associated with the event processing device 200 to sign his or her name. The signature region 210 may then be used as an additional form of authentication (e.g., a signature on the event processing device 200 may be compared to a signature on, for example, a driver's license or other government issued identification).

Figure 3A:
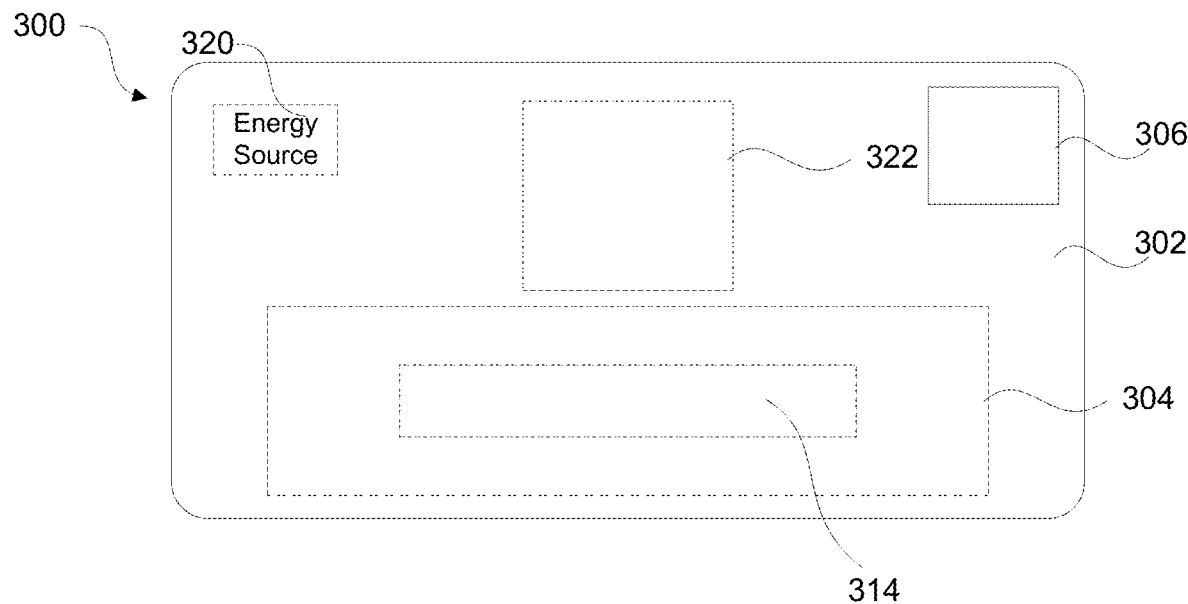
FIGS. 3A and 3B illustrate another example event processing device in accordance with one or more aspects described herein.
Figure 3B:
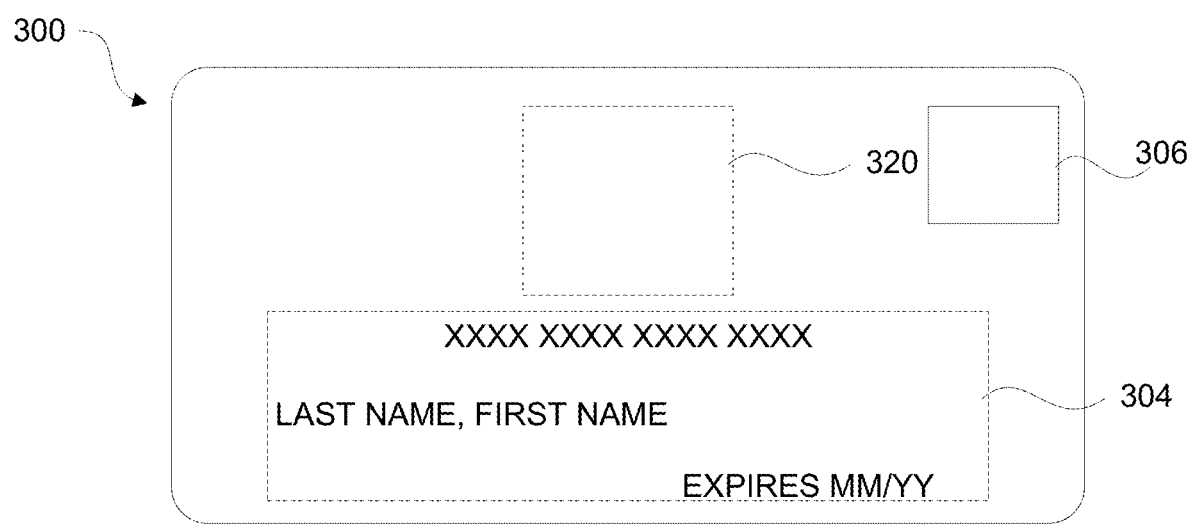

FIGS. 3A and 3B illustrate another example event processing device that may be used with one or more aspects described herein. Aspects and features described with respect to FIGS. 3A and 3B may be used alone or in combination with the event processing device 300 shown or with one or more other event processing devices without departing from the invention. Similar to the arrangement of FIGS. 2A and 2B, the event processing device 300 includes a generally planar region 302. The event processing device may also include a chip 306 for processing events in at least some examples.

Further, the event processing device 300 may include one or more sensors 322. The sensors 322 may be arranged anywhere on the generally planar region 302 of the event processing device 300 (e.g., front, back, top, bottom, or the like). The sensors 322 may include one or more different types of sensors. For instance, the sensors may include biometric sensors that may capture biometric data of a user attempting to use the event processing device 300 (e.g., attempting to process an event). The sensors 322 may detect biometric data such as fingerprints, iris scans, and the like. In some examples, the sensors 322 may be configured to detect additional or other biometric data, such as temperature, blood flow, chemistry of perspiration of the user, deoxyribonucleic acid (DNA) of a user (e.g., based on skin particles in contact with the sensor), and the like. This biometric data may be captured and analyzed to determine whether the biometric data matches pre-stored biometric data of one or more authorized users of the event processing device 300.

If the biometric data does match pre-stored biometric data, the event processing device may be activated. For instance, a chip 306 arranged on the device may be activated and enabled for use (e.g., in processing a transaction). In some examples, the chip 306 may remain activated for a predetermined time period. After expiration of the predetermined time period, the chip may be automatically deactivated (e.g., transferred from an active state to an inactive state) to disable ability of the event processing device 300 to process events.

In some examples, feedback may be transmitted from the event processing device to the event processing device activation control computing platform 110 at predetermined time intervals (e.g., every 30 seconds, every minute, every two minutes, or the like). Accordingly, the event processing device activation control computing platform 110 can monitor a position, location, user in contact, or the like, of the event processing device to confirm it is still in possession of the authorized user, is in a same location as expected, or the like.

In some arrangements, the event processing device 300 may include an information display region 304. In some examples, the information display region may be generally obscured (e.g., not visible to a user) when the event processing device is in a deactivated or disabled state (e.g., is not enabled for processing events). For instance, as shown in FIG. 3A, the event processing device 300 may be in a deactivated or disabled state and the information display region 304 may be generally blank because the information contained in that region is not visible to a user.

Alternatively, FIG. 3B illustrates the event processing device 300 in one example activated state in which the event processing device 300 is enabled for use. As shown in FIG. 3B, the information display region is visible to a user and includes information such as a name of a user, an account number associated with the event processing device, an expiration date, and the like. In some examples activating the event processing device 300 may cause illumination (e.g., a signal, command or instruction may be transmitted) of one or more light emitting diodes (LEDs) 314. Accordingly, when the event processing device 300 is activated, the LEDs 314 may illuminate, thereby making visible the information contained in the information display region. In some examples, the information contained in the information display region may only be visible when the LEDs are illuminated.

In some examples, the event processing device 300 may include an energy source to enable one or more aspects or features described herein. For instance, the event processing device 300 may include an energy source 320 which may include a kinetic process that may be powered based on movement of the event processing device 300 (e.g., by a user carrying the event processing device 300). In some examples, the event processing device may include a rotating pendulum attached to a gear that meshes with a pinion. As the event processing device moves (e.g., is carried by a user), the pendulum turns and rotates the pinion. This is coupled to an electrical generator which charges a capacitor or rechargeable battery. In another example, the event processing device 300 may include piezoelectric devices that may be activated by the user holding the event processing device and may generate electricity.

The energy source 320 may be used to power the one or more LEDs, or one or more other features or aspects of the event processing device 300. In some examples, the energy source 320 (or other feature of the event processing device) may include a processor that may be used to transmit and receive signals, instructions or commands (e.g., transmit biometric data, receive instructions or commands to activate/deactivate, or the like).

Figure 4:
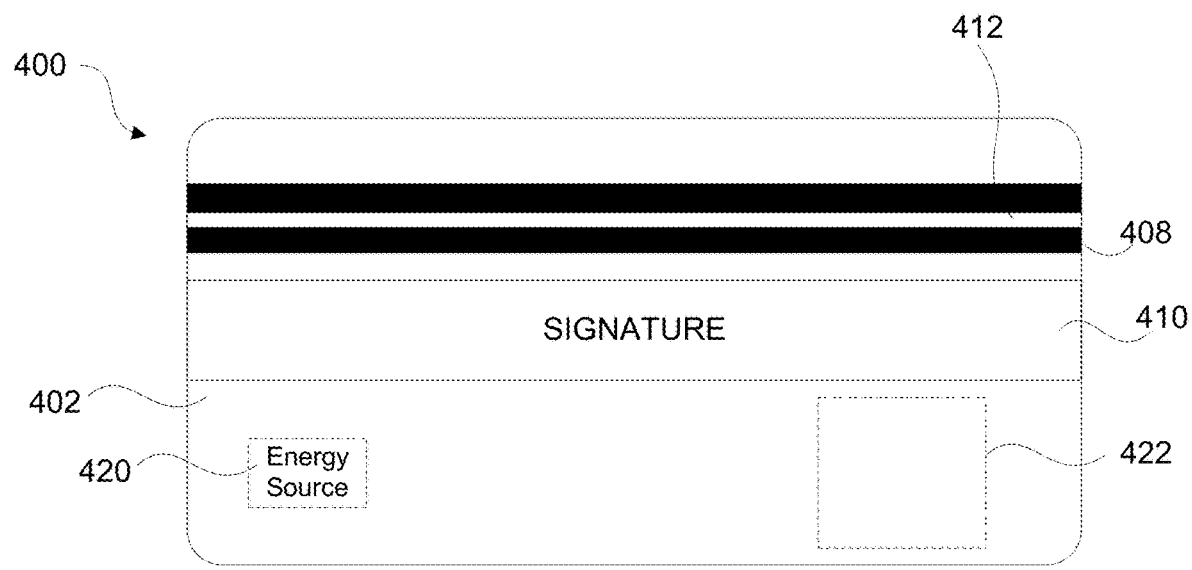
FIG. 4 illustrates yet another example event processing device in accordance with one or more aspects described herein.

FIG. 4 illustrates another example event processing device 400. The aspects and features described with respect to event processing device 400 may be used alone or in combination with one or more other features or aspects described herein with respect to other event processing devices (e.g., event processing device 200, 300 or the like) without departing from the invention.

The event processing device 400 is shown in a rear view and, similar to event processing devices 200, 300, includes a generally planar region 402. The event processing device 400 may include an energy source 420 which may be used to power one or more aspects of the event processing device 400. In some examples, the event processing device 400 may include a sensor 422 arranged on a rear of the event processing device 400. Additionally or alternatively, the sensor may be arranged on a front of the event processing device 400.

The event processing device 400 may include a signature line or region 410. Similar to arrangements discussed above, the signature line or region 410 may include a space in which an authorized user may sign his or her name. The signature may then be used as a form of authentication of the user.

The event processing device 400 may further include a magnetic strip 408. The magnetic strip 408 may store encoded data that may be used to process one or more events (e.g., name, account number, and the like). In some examples, the magnetic strip 408 may include a wire 412 or other device to temporarily (or, in some examples, permanently) distort the magnetic strip 408 or data contained thereon. In some examples, deactivation of the event processing device 400 (e.g., in response to a biometric or other data not matching data of an authorized user, or the like) may include causing or initiating a flow of electrical current through wire 412. The current flow may cause or generate a short-term magnetic field which may generate noise, scramble, or otherwise distort the magnetic strip and/or data contained thereon to render the magnetic strip useless or unusable in processing an event.

Figure 5A:
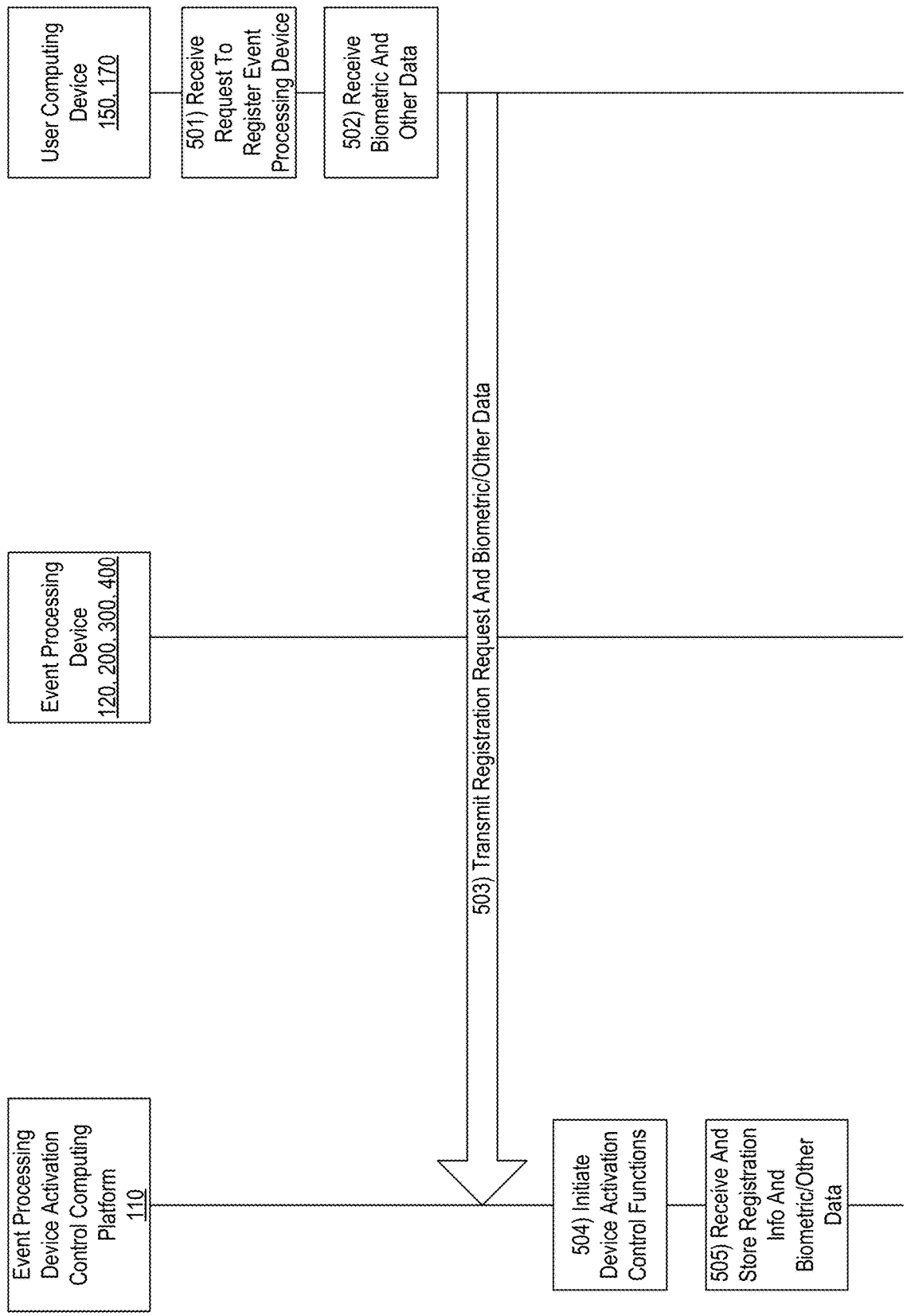
Figure 5B:
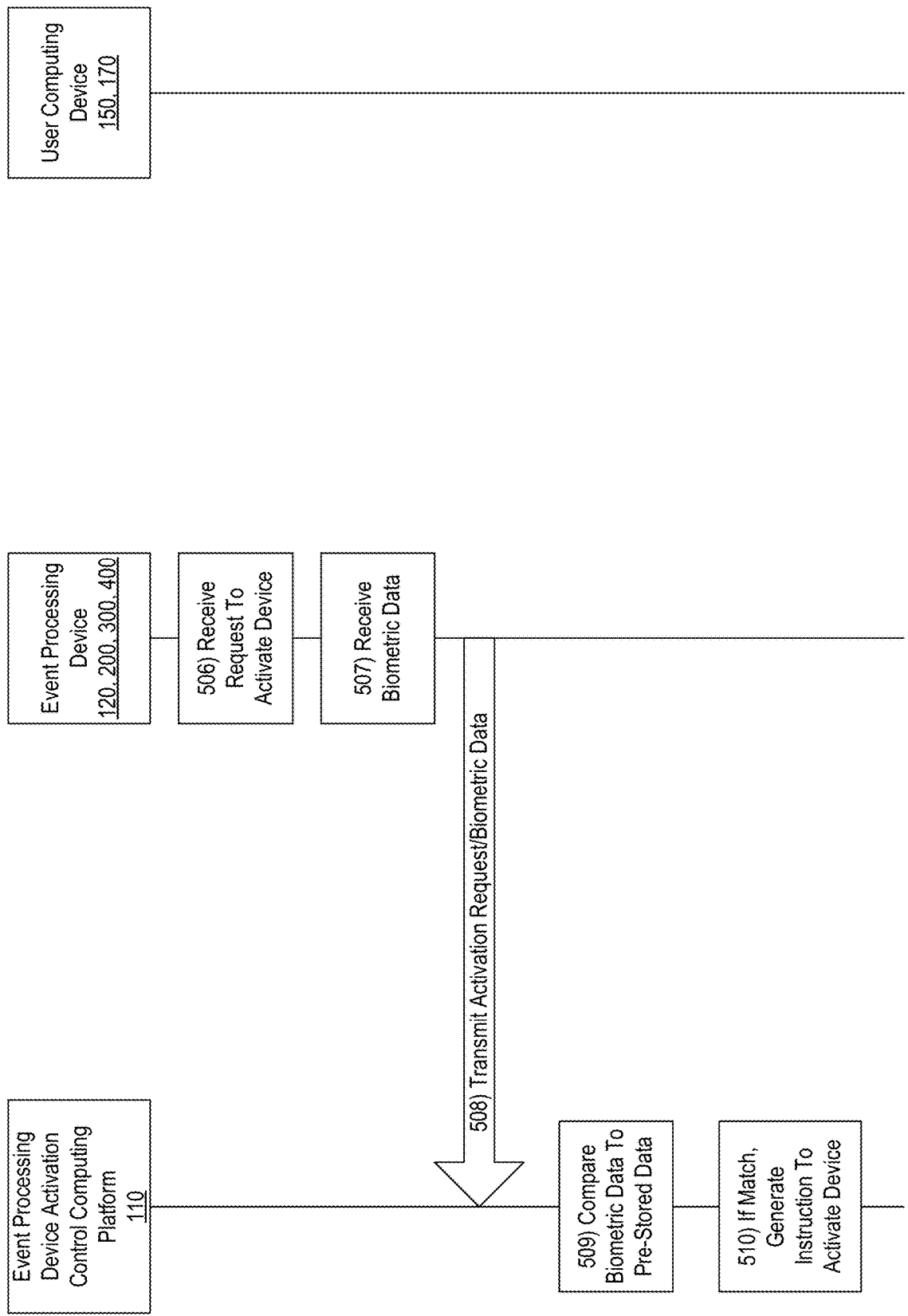

FIGS. 5A-5C depict an illustrative event sequence for implementing and using event processing device activation control functions in accordance with one or more aspects described herein. The events shown in the illustrative event sequence are merely one example sequence and additional events may be added, or events may be omitted, without departing from the invention.

Referring to FIG. 5A, at step 501, a request to register an event processing device 120 may be received. Although aspects herein may be described with respect to event processing device 120, one or more features or aspects may be used with event processing device 200, 300, 400, or any other event processing device without departing from the invention.

In some examples, the request may be received via a computing device such as local user computing device 150, local user computing device 155, remote user computing device 170, remote user computing device 175. In some examples, one or more of the computing devices may be a computing device associated with an administrator or customer service associate of one or more systems that may aid in facilitating registration of the event processing device, the user within the system and the like. In some examples, the computing device 150, 170 may be a self-service kiosk arranged at, for example, a financial institution associated with an account of the event processing device, or the like. The self-service kiosk may include a plurality of options that may aid a user in registering an event processing device, registering with the system, and the like.

At step 502, data may be received from a user registering an event processing device 120. For instance, a name, contact information, login credentials, and the like, may be received from the user. In some examples, the user may provide an account number associated with the event processing device 120. In some examples, the user may also provide biometric data or information to the computing device 150, 170. For instance, one or more sensors on computing device 150, 170 may be used to capture a fingerprint, iris scan, DNA, sweat particles, blood flow measures, temperature or heat signature measures, and the like. In some arrangements, a user may be requested to provide government issued identification during the registration process to confirm that the user is an expected user.

In some examples, data associated with multiple users (e.g., multiple authorized users of an event processing device 120) may be received. For instance, if two spouses have a joint account with an event processing device 120, biometric data from each spouse may be captured and associated with the event processing device 120.

At step 503, the received biometric data and other information associated with the authorized user(s) may be transmitted to the event processing device activation detection computing platform 110. At step 504, receipt of the data may cause initiation and/or activation of event processing device activation control functions. For instance, receipt of the information provided during the registration processing may cause the event processing device activation control computing platform 110 to initiate one or more activation control functions. [63] At step 505, the biometric and other data associated with the authorized user(s) may be stored by the event processing device activation control computing platform 110 (e.g., for comparison to later received data in an attempt to authenticate a user and/or activate or enable the event processing device 120).

With reference to FIG. 5B, at step 506, a request to activate an event processing device 120 may be received. For instance, a user may initiate an event, such as a transaction, with the event processing device 120 (e.g., may swipe the device 120 through a payment processing or point of sale system, may insert the device 120 into a payment processing or point of sale system, or the like). In another example, the user may remove the event processing device 120 from a wallet, pocket, or the like, such that contact is made with a sensor on the event processing device 120.

At step 507, biometric data may be received via the event processing device 120. For instance, a user may place a finger, or other appropriate body part on the sensor of the event processing device 120 and the event processing device may collect biometric data from the user.

At step 508, the biometric data may be transmitted to the event processing device activation control computing platform 110 with an activation request. At step 509, the received biometric data may be compared to pre-stored biometric data associated with an authorized user of the event processing device. If a match occurs, in step 510, an instruction, command or signal to activate and/or enable the event processing device 120 for use may be generated.

With reference to FIG. 5C, at step 511, the instruction, command or signal may be transmitted from the event processing device activation control computing platform 110 to the event processing device 120. At step 512, the instruction, command or signal may be received by the event processing device 120.

At step 513, the event processing device 120 may be activated or enabled based on the instruction, command or signal received from the event processing device activation control computing platform 110. For instance, upon receiving and executing the instruction, the event processing device 120 may be activated or enabled for use in the desired or requested event. In some examples, the event processing device 120 may remain in the activated or enabled state for a predetermined amount of time. Upon expiration of the time period, the event processing device 120 may automatically transfer to a deactivated state (e.g., the event processing device 120 will not be enabled for use in event processing without further activation).

At step 514, activation of the event processing device 120 may, in some examples, cause illumination of one or more LEDs. Illumination of the LEDs may make visible to a user information found in an information display region of the event processing device 120.

At step 515, activation of the event processing device 120 may, in some examples, cause a current flowing through a wire within the magnetic strip to cease flowing. Accordingly, the magnetic strip data may be made readable or accessible by the removal of the current.

Aspects described herein with respect to the processes of FIGS. 5A-5C, as well as other processes described herein, may be performed in real-time in order to provide real-time or near real-time authentication of a user and activation of an event processing device.

Figure 6:
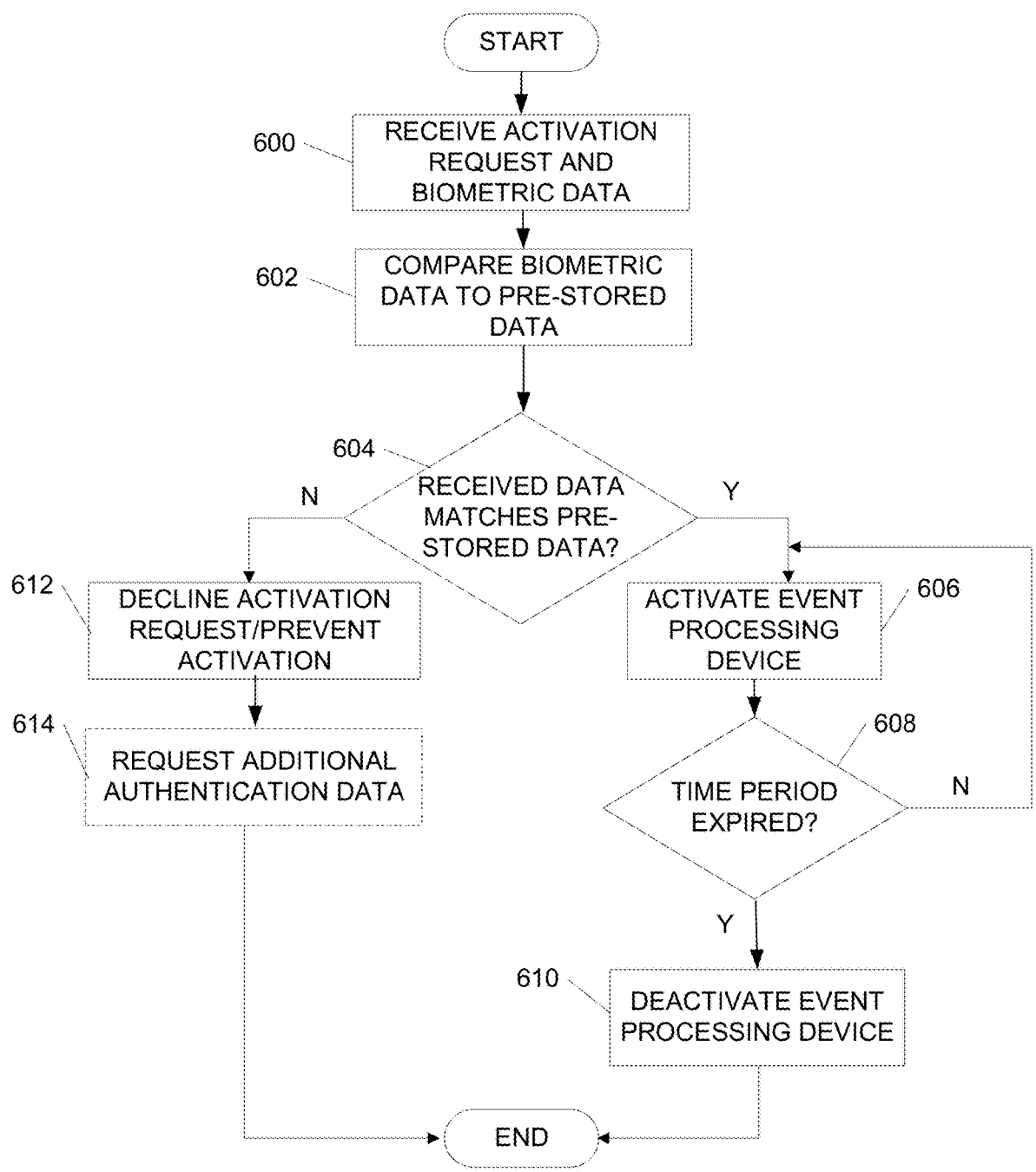
FIG. 6 depicts an illustrative method for implementing and using a system to perform event processing device activation control functions, according to one or more aspects described herein.

FIG. 6 is a flow chart illustrating one example method of implementing event processing device activation control functions in accordance with one or more aspects described herein. The processes illustrated in FIG. 6 are merely some example processes and functions. The steps shown may be performed in a different order, more steps may be added, or one or more steps may be omitted without departing from the invention.

In step 600, a request to activate an event processing device, such as event processing device 120, 200, 300, 400, may be received. In some examples, the activation request may include biometric data associated with a user requesting activation.

In step 602, the received biometric data may be compared to pre-stored biometric data associated with one or more authorized users of the event processing device. In step 604, a determination is made as to whether the received biometric data matches the pre-stored data. If so, the event processing device may be activated and/or enabled for use (e.g., in processing the requested event) in step 606. In some examples, as discussed herein, activating the event processing device may include one or more of: activating a chip for use in processing an event, causing illumination of one or more LEDs to cause display of information in an information display region or removing a current flowing through a wire in the magnetic strip of the device.

In step 608, a determination is made as to whether a predetermined time period of activation has expired. If not, the process may return to step 606 and may maintain activation of the event processing device. If the time period has expired in step 608, the event processing device may be automatically deactivated in step 610. For instance, in some examples, the event processing device activation control computing platform 110 may determine that a predetermined time period has expired and, in response, may generate an instruction, command or signal to deactivate the event processing device. The instruction, command or signal may be executed by the device to deactivate or disable the event processing device.

If, in step 604, the received biometric data does not match pre-stored data, the activation request associated with the event processing device may be declined and/or activation of the event processing device may be prevented in step 612. For instance, an instruction, command or signal may be transmitted to the event processing device instructing the event processing device to not illuminate the information display region, maintain a current running through a wire distorting data on the magnetic strip, preventing activation of a chip for use, or the like.

In some examples, optional step 614 may include requesting additional authentication information from a user. For instance, if the received biometric data does not match (or a percent of match does not meet a predetermined threshold percent of match) additional authenticating information may be requested from user. In some examples, the additional authenticating information may include a personal identification number (PIN), answer to a security question, request to display a government issued photo identification, or the like.

As discussed herein, the arrangements described provide for efficient processes for authenticating a user and processing secure events. As discussed herein, biometric data of a user may be used to authenticate a user. In some examples, this biometric data may go beyond fingerprints, iris scans, or the like. Additionally or alternatively, the biometric data may include DNA of a user, composition of perspiration of a user, blood flow, temperature, heat signature, or the like. Accordingly, because biometric data such as fingerprints can be modified or altered, use of other types of biometric data may provide an increased level of security and confidence when authenticating a user to process an event.

In some examples, the event processing device may include one or more sensors configured to detect pressure. Accordingly, each user may have a unique manner of holding the event processing device. As such, pressure on different portions of the event processing device may be used as a form of authentication of the user.

In some arrangements, an array of authentication options may be available for a user. For instance, if biometric data yields a partial match (e.g., a match below a predetermined percent match threshold) the user may be authenticated but a type, amount, or the like, of event that can be processed by that user may be limited. In some examples, if the biometric data used for authentication is DNA, a sister, parent, child, or the like, of the authorized user may be a partial match for the authorized user but not a full match. Accordingly, a first transaction amount limit may be placed on a transaction processed by the partial match user which may be lower than a second transaction amount limit placed on a transaction processed by a user with a full match or a match above the predetermined percent match threshold.

In some examples, a temporary profile may also be stored in conjunction with the event processing device to enable temporary authorization of a user (e.g., child, spouse, parent, or the like). The temporary user may provide his or her biometric data and that data may then be used to authenticate the user during a time period predefined by the authorized user (e.g., active for one week, one day, 4 hours, or the like).

In some arrangements, a match of less than a predetermined percent match threshold may cause some aspects of the event processing device to activate. For instance, if less than a threshold percent match is detected, an instruction may be transmitted to illuminate only a portion (e.g., less than all) of the information in the information display region (e.g., less than all numbers in an account, no expiration date, or the like).

In some examples, one or more limits or parameters of an event eligible for processing may be based on how the user is authenticated. For instance, if a fingerprint is used to authenticate a user, and a match occurs, a first set of parameters (e.g., type of transaction, limit on amount of transaction, or the like) may be placed on an event being processed. However, if DNA, is used, or if fingerprint is used in combination with another form of authentication, a second set of parameters (e.g., type of transaction, limit on amount of transaction, or the like) may be placed on an event being processed.

In some arrangements, a user may register his or her event processing device via a computing device. In some examples, the computing device may include a computing device of the user, such as a smartphone, tablet computing device, wearable computing device, or the like, of the user. Accordingly, the user may provide requested biometric data (e.g., via an application executing on the computing device) and the biometric data may be transmitted to the event processing device activation control computing platform for later use in activating an event processing device.

In some examples, a user may be able to customize aspects of use of the event processing device. For example, if a user having a match percentage less than a threshold percent match (e.g., a predetermined amount to consider at least a partial match) attempts to activate an event processing device to process an event, a notification may be generated and transmitted to, for instance, a computing device of an authorized user. The notification may include a request to authorize the user to process the requested event. In some examples, details of the event may be included, such as type of transaction, products being purchased, amount, or the like. Accordingly, a user may provide input to approve or deny the request to activate the event processing device. In some examples, a user may specify users, types of transactions, amount limits, or the like, for which a user having less than the threshold percent match may be automatically authorized to process the event.

In some aspects, machine learning may be used to monitor events processed by the user, events or other users authorized by the user, and the like, to automatically determine whether to activate an event processing device having a less than full match. For instance, machine learning may be used to determine a link between a particular second user (e.g., a child of the authorized user) and purchases made at a particular location (e.g., a college bookstore). Accordingly, the system may automatically activate the event processing device in situations in which the second user is attempting to activate the event processing device for the college bookstore.

In some arrangements, the event processing device activation control computing platform 110 may detect a pattern of storage of the event processing device. For instance, one or more pressure sensors may be distributed on the event processing device and may detect a pattern of pressure in a particular storage situation (e.g., a user's wallet, purse, pocket, or the like). In some examples, machine learning may be used to detect the pattern and identify changes in the pattern. For instance, if an event processing device is stolen and the unauthorized user puts the event processing device in his or her wallet, the system may detect the change in storage pattern and may disable use of the device, transmit a notification to an authorized user, or the like.

In still other examples, the event processing device may be activated for a predetermined amount of funds for a predetermined time. For instance, a user may be authenticated via biometric data and the event processing device may be handed to another use (e.g. a sales associate at a store, a waiter, or the like). The event processing device may remain activated for a predetermined amount of time even if the user biometric data changes (e.g., because the card has been handed off to complete the event processing. In some examples, the event processing device may only be activated for a predetermined amount (e.g., the amount of the event being processed) in order to limit any potential unauthorized activity.

Figure 7:
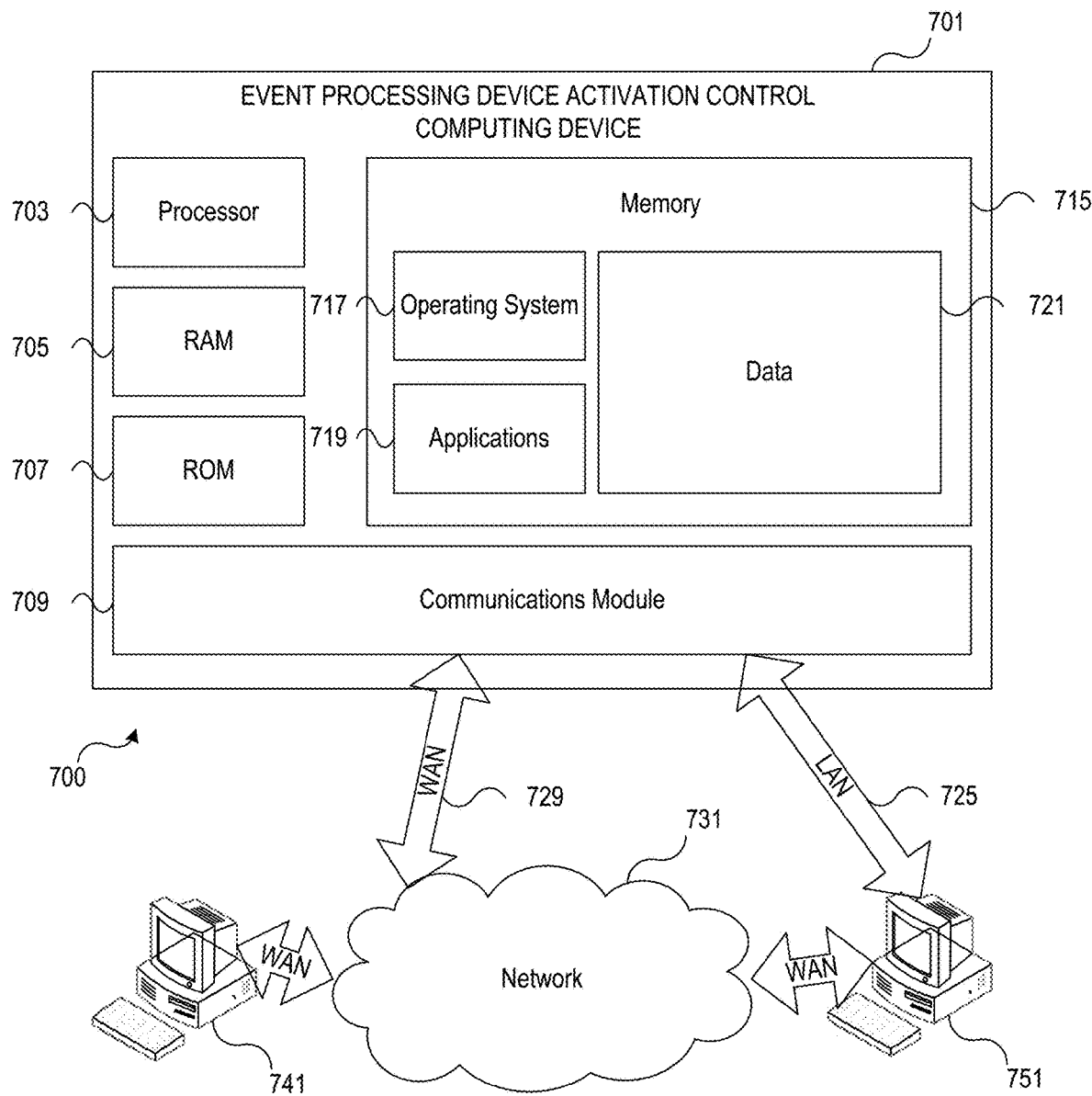
FIG. 7 illustrates one example operating environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include event processing device activation control computing device 701 having processor 703 for controlling overall operation of event processing device activation control computing device 701 and its associated components, including Random Access Memory (RAM) 705, Read-Only Memory (ROM) 707, communications module 709, and memory 715. Event processing device activation control computing device 701 may include a variety of computer readable media. Computer readable media may be any available media that may be accessed by event processing device activation control computing device 701, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on event processing device activation control computing device 701. Such a processor may execute computer-executable instructions stored on a computer-readable medium.

Software may be stored within memory 715 and/or storage to provide instructions to processor 703 for enabling event processing device activation control computing device

701 to perform various functions as discussed herein. For example, memory 715 may store software used by event processing device activation control computing device 701, such as operating system 717, application programs 719, and associated database 721. Also, some or all of the computer executable instructions for event processing device activation control computing device 701 may be embodied in hardware or firmware. Although not shown, RAM 705 may include one or more applications representing the application data stored in RAM 705 while event processing device activation control computing device 701 is on and corresponding software applications (e.g., software tasks) are running on event processing device activation control computing device 701.

Communications module 709 may include a microphone, keypad, touch screen, and/or stylus through which a user of event processing device activation control computing device 701 may provide input, and may also include one or more of a speaker for providing audio output and a video display device for providing textual, audiovisual and/or graphical output. Computing system environment 700 may also include optical scanners (not shown).

Event processing device activation control computing device 701 may operate in a networked environment supporting connections to one or more remote computing devices, such as computing devices 741 and 751. Computing devices 741 and 751 may be personal computing devices or servers that include any or all of the elements described above relative to event processing device activation control computing device 701.

The network connections depicted in FIG. 7 may include Local Area Network (LAN) 725 and Wide Area Network (WAN) 729, as well as other networks. When used in a LAN networking environment, event processing device activation control computing device 701 may be connected to LAN 725 through a network interface or adapter in communications module 709. When used in a WAN networking environment, event processing device activation control computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 8:
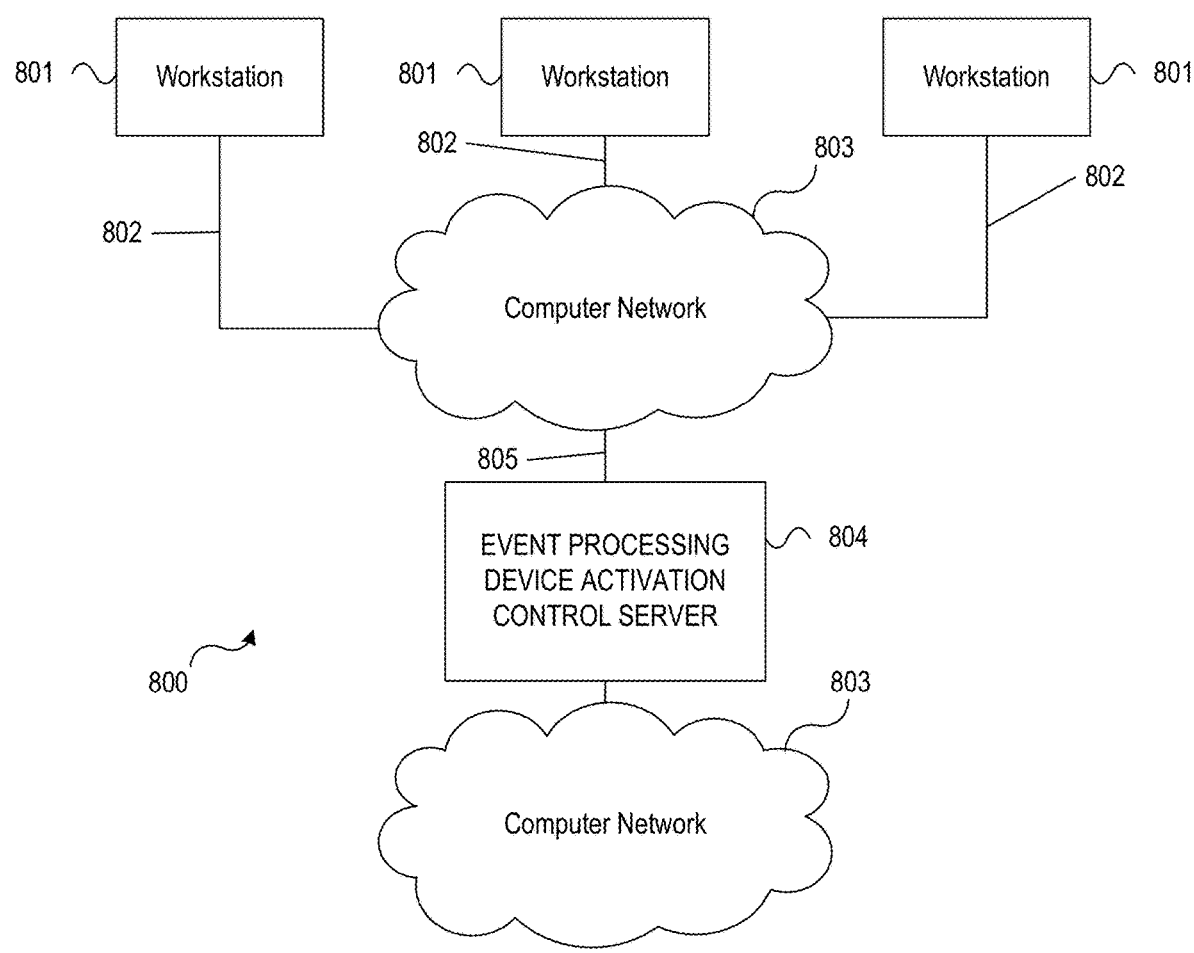
FIG. 8 depicts an illustrative block diagram of workstations and servers that may be used to implement the processes and functions of certain aspects of the present disclosure in accordance with one or more aspects described herein.

FIG. 8 depicts an illustrative block diagram of workstations and servers that may be used to implement the processes and functions of certain aspects of the present disclosure in accordance with one or more example embodiments. Referring to FIG. 8, illustrative system 800 may be used for implementing example embodiments according to the present disclosure. As illustrated, system 800 may include one or more workstation computers 801. Workstation 801 may be, for example, a desktop computer, a smartphone, a wireless device, a tablet computer, a laptop computer, and the like, configured to perform various processes described herein. Workstations 801 may be local or remote, and may be connected by one of communications links 802 to computer network 803 that is linked via communications link 805 to event processing device activation control server 804. In system 800, event processing device activation control server 804 may be a server, processor, computer, or data processing device, or combination of the same, configured to perform the functions and/or processes described herein. Server 804 may be used to receive data, determine whether the received data matches pre-stored data, generate and/or transmit an instruction, command or signal to activate or deactivate an event processing device, and the like.

Computer network 803 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 802 and 805 may be communications links suitable for communicating between workstations 801 and event processing device activation control server 804, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. An event processing device, comprising:
a generally planar portion having a first surface and an opposite, second surface, the first surface including a biometric feature sensor and the second surface including a magnetic strip, the generally planar portion including:
a chip configured to process one or more events by the event processing device, wherein the chip includes an activated state in which the chip may be enabled for use in processing an event and a deactivated state in which the chip is disabled and is not used for processing an event;
a plurality of light emitting diodes arranged in the event processing device; and
an information display region including event processing device information, the event processing device information including at least an account number associated with the event processing device,
wherein the plurality of light emitting diodes is configured to illuminate upon authentication of a user of the event processing device based on data received from the biometric feature sensor,
wherein illuminating the plurality of light emitting diodes includes making the event processing device information in the information display region visible,
wherein authentication of the user causes activation of processing events having a first set of parameters using the event processing device based on receiving a first type of biometric data from the biometric feature sensor and activation of processing events having a second set of parameters, different from the first set of parameters, using the event processing device based on receiving a second type of biometric data, different from the first type of biometric data, from the biometric feature sensor, and
wherein the plurality of light emitting diodes is configured to remain not illuminated when a user of the event processing device is not authenticated based on data received from the biometric feature sensor to prevent the event processing device information in the information display region from being visible.

2. The event processing device of claim 1, wherein the biometric feature sensor is configured to detect deoxyribonucleic acid (DNA) of a user, chemistry of perspiration of a user, fingerprint of a user, and blood flow of a user.

3. The event processing device of claim 1, wherein the event processing device information includes at least one of: a name of a user associated with the event processing device or an expiration date of the event processing device.

4. The event processing device of claim 1, wherein the magnetic strip includes encoded data associated with at least one of: an authorized user of the event processing device or the account number associated with the event processing device.

5. The event processing device of claim 1, further including an energy source arranged on the generally planar portion.

6. A system, comprising:
an event processing device, including a biometric feature sensor arranged on a first surface of the event processing device, at least one light emitting diode, a chip configured to process one or more events by the event processing device, wherein the chip includes an activated state in which the chip may be enabled for use in processing an event and a deactivated state in which the chip is disabled and is not used for processing an event, and a magnetic strip containing encoded data arranged on a second side of the event processing device opposite the first side;
a computing platform, including:
at least one processor;
a communication interface communicatively coupled to the at least one processor; and
memory storing computer-readable instructions that, when executed by the at least one processor, cause the computing platform to:
receive, from the event processing device, a request to activate the event processing device;
receive, from the biometric feature sensor in the event processing device, biometric data of a user requesting to activate the event processing device;
compare the received biometric data of the user to pre-stored biometric data of an authorized user of the event processing device;
determine, based on the comparing whether the received biometric data matches one of a first type of pre-stored biometric data or a second type of pre-stored biometric data;
responsive to determining that the received biometric data matches the first type of pre-stored biometric data, authenticating the user requesting to activate the event processing device and activating the event processing device to enable use of the event processing device to process events having a first set of parameters;

responsive to determining that the received biometric data matches the second type of pre-stored biometric data, authenticating the user requesting to activate the event processing device and activating the event processing device to enable use of the event processing device to process events having a second set of parameters different from the first set of parameters, wherein activating the event processing device includes activating the at least one light emitting diode to illuminate an information display region on the event processing device and make visible event processing device information in the information display region and wherein the event processing device information includes at least an account number associated with the event processing device; and responsive to determining that the received biometric data does not match the pre-stored data, preventing activation of the event processing device to prevent use of the event processing device.

7. The system of claim 6, wherein the biometric data includes at least one of: deoxyribonucleic acid (DNA) of the user requesting to activate the event processing device, chemistry of perspiration of the user requesting to activate the event processing device, fingerprint of the user requesting to activate the event processing device, and blood flow of the user requesting to activate the event processing device.

8. The system of claim 6, wherein preventing activation of the event processing device includes preventing illumination of the at least one light emitting diode to prevent event processing device information in an information display region from being visible.

9. The system of claim 6, further including a wire extending through at least a portion of the magnetic strip.

10. The system of claim 9, wherein preventing activation of the event processing device includes transmitting an electrical current through the wire to distort data encoded on the magnetic strip.

11. The system of claim 9, wherein activating the event processing device includes preventing an electrical current from passing through the wire to distort data encoded on the magnetic strip.

12. An event processing device activation control computing platform, comprising:

at least one processor;

a communication interface communicatively coupled to the at least one processor; and memory storing computer-readable instructions that, when executed by the at least one processor, cause the event processing device activation control computing platform to:

receive, from an event processing device, a request to activate the event processing device, the event processing device including a chip configured to process one or more events by the event processing device, wherein the chip includes an activated state in which the chip may be enabled for use in processing an event and a deactivated state in which the chip is disabled and is not used for processing an event;

receive, from a biometric feature sensor in the event processing device, biometric data of a user requesting to activate the event processing device;

compare the received biometric data of the user to pre-stored biometric data of an authorized user of the event processing device;

determine, based on the comparing whether the received biometric data matches one of: a first type of pre-stored biometric data or a second type of pre-stored biometric data;

responsive to determining that the received biometric data matches the first type of pre-stored data, authenticating the user requesting to activate the event processing device and activating the event processing device to enable use of the event processing device to process events having a first set of parameters;

responsive to determining that the received biometric data matches the second type of pre-stored biometric data, authenticating the user requesting to activate the event processing device and activating the event processing device to enable use of the event processing device to process events having a second set of parameters different from the first set of parameters, wherein activating the event processing device includes transmitting an instruction to the event processing device activating at least one light emitting diode on the event processing device to illuminate an information display region on the event processing device and make visible event processing device information in the information display region; and responsive to determining that the received biometric data does not match the pre-stored data, preventing activation of the event processing device to prevent use of the event processing device.

13. The event processing device activation control computing platform of claim 12, wherein the biometric data includes at least one of: deoxyribonucleic acid (DNA) of the user requesting to activate the event processing device, chemistry of perspiration of the user requesting to activate the event processing device, fingerprint of the user requesting to activate the event processing device, and blood flow of the user requesting to activate the event processing device.

14. The event processing device activation control computing platform of claim 12, wherein preventing activation of the event processing device includes transmitting an instruction to the event processing device preventing illumination of at least one light emitting diode on the event processing device to prevent event processing device information in an information display region from being visible.

15. The event processing device activation control computing platform of claim 12, wherein preventing activation of the event processing device includes transmitting an instruction to the event processing device causing transmission of an electrical current through a wire in a magnetic strip of the event processing device to distort data encoded on the magnetic strip.

16. The event processing device of claim 4, wherein the magnetic strip further includes a wire extending therethrough and configured to distort the encoded data to render the event processing device disabled responsive to determining that the user of the event processing device is not authenticated.

17. The event processing device of claim 5, wherein the energy source includes a kinetic process powered based on movement of the event processing device.

18. The event processing device of claim 1, wherein illuminating the plurality of light emitting diodes includes making less than all of the event processing device information in the information display region visible responsive to the data received from the biometric feature sensor matching less than a predetermined percentage match of pre-stored biometric data.

\* \* \* \* \*